Sept. 14, 1943.　　　　F. J. LINGEL　　　　2,329,630
EXPOSURE METER
Filed May 26, 1941　　　　3 Sheets-Sheet 1
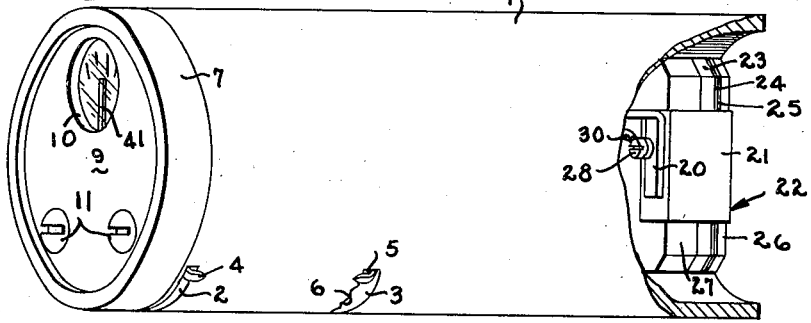
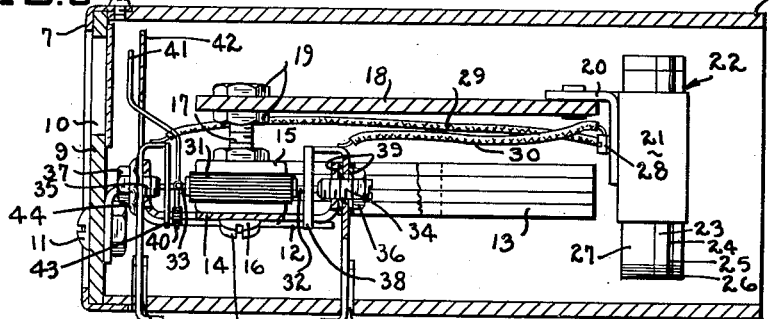
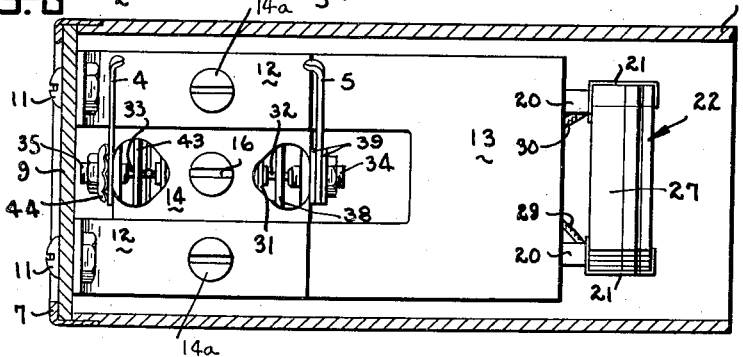
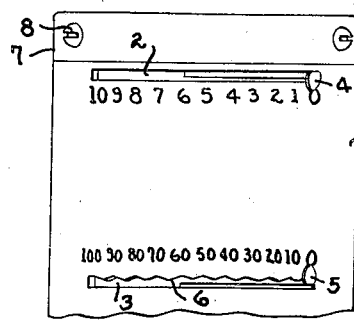
Inventor
FREDERICK J. LINGEL
by Toulmin & Toulmin
Attorneys Sept. 14, 1943.                F. J. LINGEL                 2,329,630
                              EXPOSURE METER
                           Filed May 26, 1941              3 Sheets-Sheet 2
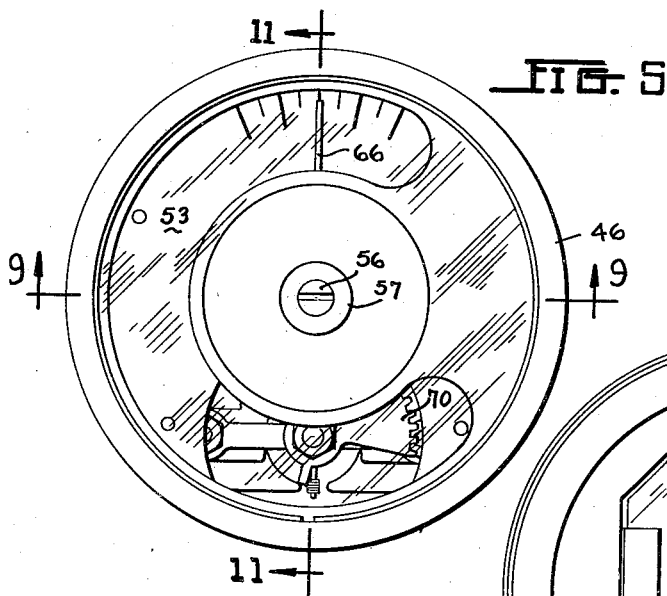
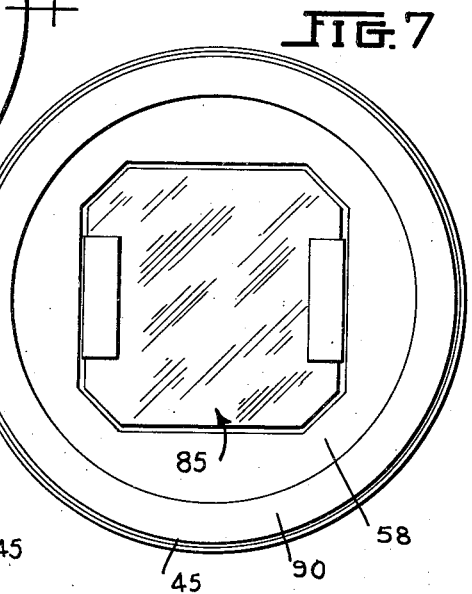
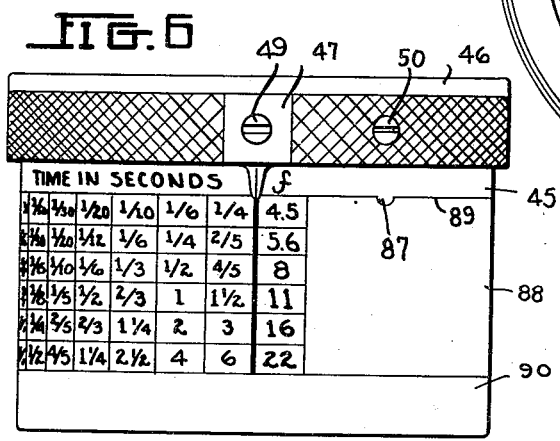
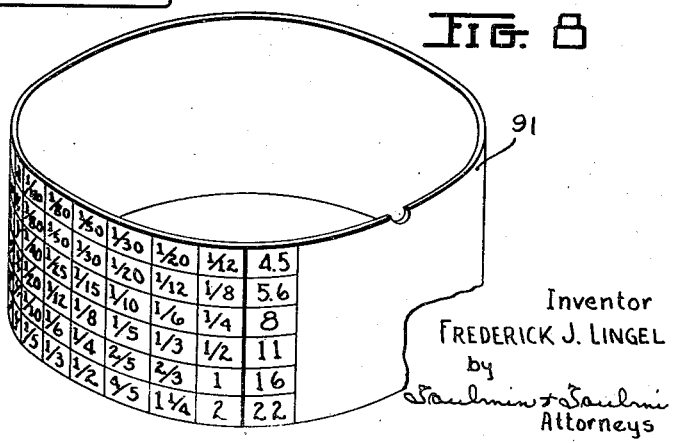
Inventor
FREDERICK J. LINGEL
by
Attorneys

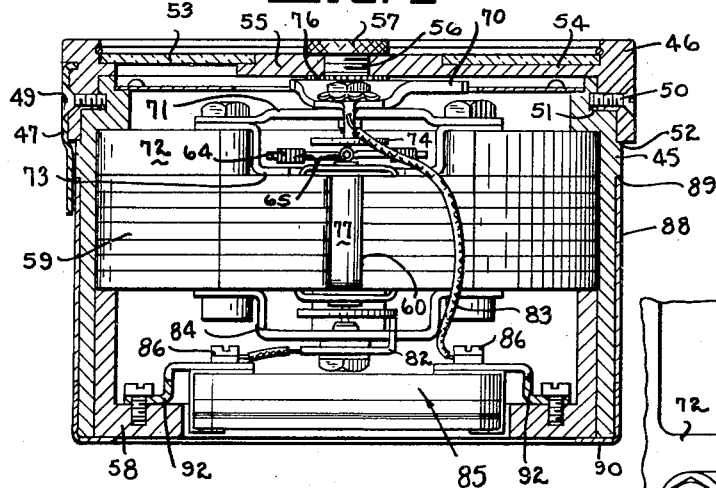
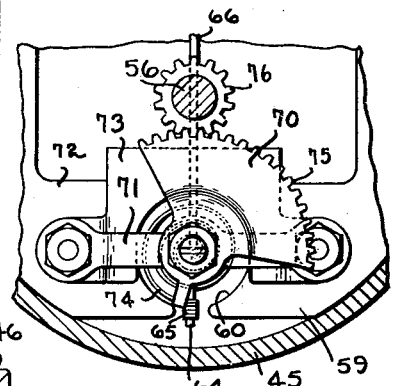
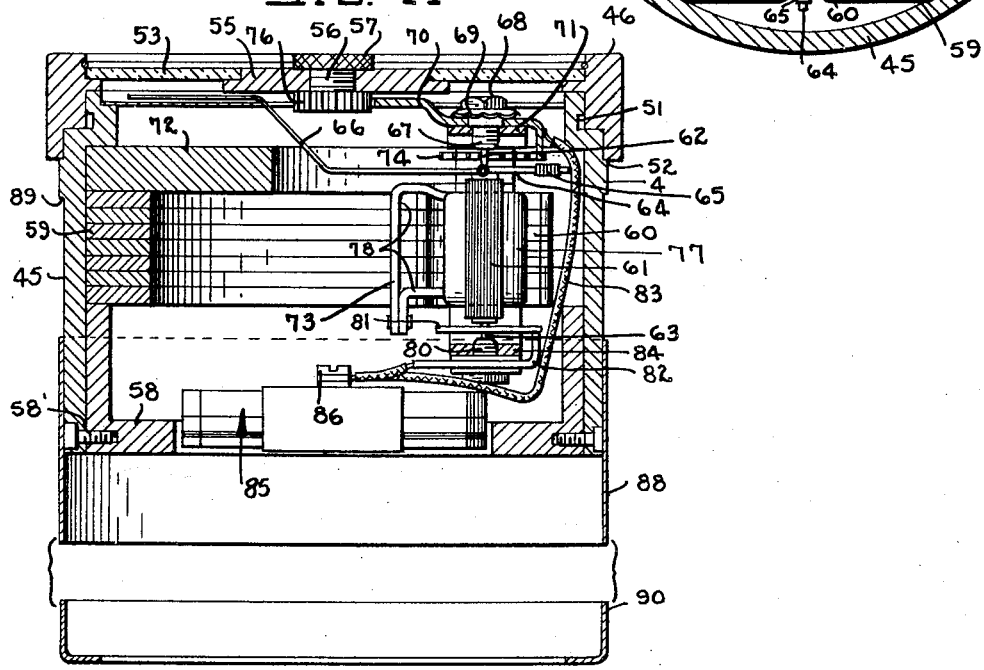

Patented Sept. 14, 1943

2,329,630

UNITED STATES PATENT OFFICE 2,329,630

EXPOSURE METER

Frederick J. Lingel, Bluffton, Ohio, assignor to Ray L. Triplett, Bluffton, Ohio Application May 26, 1941, Serial No. 395,149

4 Claims. (Cl. 88—23)

The present invention relates to light-measuring devices, and more particularly to exposure meters used in photography.

The ordinary form of exposure meter employs a current-measuring device to which is connected a photovoltaic cell, and when the latter is exposed to light reflected by an object, the generated electromotive force is impressed across the actuating coil of the measuring device to move the pointer. In case the photovoltaic cell is of the type in which the generated electromotive force varies directly as the quantity of light which activates the cell, the position assumed by the pointer becomes a direct measurement of the amount of light received by the cell. This measurement is then translated into the proper time of exposure for a given "f" opening of the camera lens by means of reading charts which usually form part of the exposure meter. During this translation or calculation process the light-reading obtained by the meter must be constantly kept in mind because when the instrument is withdrawn from its light-receiving position to make the calculations, the pointer will have returned to zero. This is not altogether satisfactory because the translation charts on most of the exposure meters are difficult to read, and in some cases are difficult to manipulate. Moreover, in all prior types of exposure meters indications given by the pointer must be transferred manually to the calculation charts. There is no direct relation between the pointer and the charts, thus necessitating additional work and additional chances of error in making the calculations.

The primary object of the invention is to provide an exposure meter which retains indefinitely the last reading shown by the light-measuring pointer so that this indication is always available for reference during the time of making the exposure calculations.

Another object is to provide an exposure meter in which the movement of the pointer is translated directly into the proper exposure time or its corresponding lens opening, thus tending to eliminate any error which might be made in the prior-art meters, in which the reading of the pointer is manually transferred to the calculation charts.

Other objects and advantages will appear from the following description taken in connection with the drawings.

In the drawings:

Figure 1 is a perspective view, partly broken away, of the improved light meter.

Figure 2 is a vertical section of the meter shown in Figure 1, and taken along the central axis.

Figure 3 is a horizontal sectional view of the meter shown in Figure 1, and taken along the central axis.

Figure 4 is a fragmentary elevational view of the adjustment lever end of the improved exposure meter.

Figure 5 is a plan view looking into the face of a modified form of light meter which is adapted directly to give correct times of exposure when activated by reflected light.

Figure 6 is an elevational view of the exposure meter shown in Figure 5.

Figure 7 is a bottom view of the same instrument, and showing more particularly the photovoltaic cell.

Figure 8 is a perspective view of a typical chart which may be temporarily carried by the meter shown in Figure 6 as a substitute for the chart illustrated in that figure.

Figure 9 is a vertical sectional view, slightly enlarged, taken along the line 9—9 in Figure 5.

Figure 10 is a fragmentary plan view looking down on the actuating mechanism by which the position of the pointer shown in Figure 9 is restored to zero.

Figure 11 is a vertical sectional view taken along the line 11—11 in Figure 5, and illustrating the manner in which the calculating charts can be readily substituted for one another, depending on the emulsion speeds.

Referring more particularly to Figures 1 to 4, the numeral 1 designates a cylindrical casing which may be formed of a non-magnetic metal, such as aluminum or brass, but which preferably is formed of a moldable material such as Bakelite. There is a pair of arcuate notches 2, 3 provided around a limited portion of the casing 1, these notches being adapted to receive a pair of bent levers 4, 5, the purpose of which will be explained hereinafter. If desired, these notches may be provided with a serrated edge, indicated at 6, in order rigidly to hold either of the levers in place when set in position. The right-hand end of the casing 1 is preferably left entirely open, but the opposite end is closed. At this end there is a flanged cap 7 which is screwed, as indicated at 8, to the casing, this cap being provided with a lip which extends inwardly and holds in place a flat disc 9 of circular configuration and provided with a dial reading opening 10.

All of the operating parts of the light meter shown in these figures are carried on the disc 9 by a pair of screw bolts 11. Each of these bolts secures a strap member 12 to the disc 9, the ends of the straps remote from the bolts being screwed to the ends of the legs of a U-shaped permanent magnet 13. This magnet may be of laminated construction as indicated. There is a strap member 14 which spans the two straps 12 and is secured to the latter by the same screws 14a which secure the straps 12 to the magnetic core 13. The strap 14 carries the core 15 of a current-measuring device by means of the screw 16. The screws 14a are extended through the core 13, as indicated at 17, and carry at their upper ends a relatively thick plate 18 of heavy non-magnetic metal. Nuts 19 may be employed to determine the vertical distance between the plate 18 and the straps 12 to which it is connected.

The right-hand end of the plate 18 may be provided with a pair of angle pieces 20, which carry U-shaped clamping members 21, the latter embracing the separate elements of a photovoltaic cell 22 of any suitable and well known construction. The elements which form the photovoltaic cell may comprise an iron base member 23, coated with selenium oxide 24, or other light-sensitive material, and a thin layer of an activating metal such as cadmium 25, against which is applied a glass plate 26. The base member 23 may be reenforced by a relatively thick metal member 27, all of the elements being secured together and held in clamped position by means of the clamping members 21. The latter preferably are formed of an insulating material, and a conductor is taken from the base member 23 to the terminal 28, while a similar connection is taken from the selenium oxide layer in any suitable and well known manner to a terminal (not shown), but which is carried by the clamping member 21 opposite the member which carries the terminal 28. Wires 29, 30 are taken from the respective terminals to the movable coil 31 of the current-measuring instrument which will now be described.

This coil 31 is wound of fine wire around a rectangular frame. Shafts 32, 33 project outwardly from opposite ends of the frame, these shafts being held within jewel bearings contained in the adjustment screws 34, 35. The screws 34, 35 are held in position in line with the shafts 32, 33 by a pair of arms bent upwardly and forming part of the strap 14. The screws 34, 35 are held in their proper adjusted position by means of the nuts 36, 37. The shaft 32 carries a relatively heavy hair spring 38, the center terminus of which is secured to the shaft and the outer end is secured to the U-shaped lever 5. The lever is adapted to rotate about the screw 34 and is provided with frictionless washers 39 on each side thereof, all secured together by the nut 36.

At the opposite end of the coil 31 the shaft 33 is provided with laterally extending portions forming a cross, three of the portions being provided with counterweights 40, and the remaining portion being extended to form a pointer 41 which is adapted to swing over a dial 42. At a position between the inner end of the screw 35 and the position where the pointer 41 merges with the shaft 33, there is provided a relatively fine hair spring or filament 43, the inner point of which is connected to the shaft 33 and the outermost portion is connected to the U-shaped lever 4. A frictionless washer 44 may be provided between the nut 37 and the lever 4. As shown in Figure 2, the wires 29, 30 which lead from opposite sides of the photovoltaic cell, are connected respectively to the outer portions of the hair springs 43, 38, and electrical connections are made between the ends of the coil 31 and the inner portions of the respective hair springs so that any electromotive force generated by the photovoltaic cell is applied across the coil 31.

In operation the light meter is exposed to the light source it is desired to measure, and the current flowing through the coil 31, in the manner described hereinbefore, causes the coil to rotate on its shafts 32, 33, due to the interaction set up between the flux of the coil and the flux of the permanent magnet 13. The greater the electromotive force generated at the photovoltaic cell the farther will the coil 31 move with respect to the magnet 13 against the action of the springs 38, 43, and the greater the light intensity indicated by the pointer 41 will become. It is unnecessary to describe the physical or chemical action that takes place at the photovoltaic cell in transforming light into electrical energy. Photovoltaic cells of this character are well known in the art, and when exposed to light of even relatively small intensity will generate sufficient electromotive force to operate the pointer 41.

While the casing is still pointed toward the light source it is desired to measure, the pointer 41 is caused to move back to zero or its initial point, by applying pressure on the hair springs 38, 43 at the levers 5, 4, respectively. By moving the lever 5 which operates on the coarse hair spring 38, it is apparent that the pointer can be quickly brought back to its initial position, or nearly so, after which the lever 4 which operates on the fine hair spring 43 is manipulated to obtain a very fine adjustment of the pointer. The size and tension of the hair springs 38, 43 are such that a full movement of the lever 4 provides the same restoring force as a movement from zero to 10 of the lever 5. Thus fine and coarse adjustments are provided. When the pointer has been brought to its zero position, the intensity or volume of the light which would impinge on the photovoltaic cell can be read by the numbers directly under the tabs of the levers 4, 5.

In case it is desired to determine the time of exposure for a given "f" opening of a camera, it is merely necessary to refer to charts which may, if desired, be printed on the casing 1 and using the light values indicated by the levers 4, 5. It is apparent that during this calculation the indications of the photometer which are obtained from the levers 4, 5 are always available for repeated reference. This represents an improvement over the prior-art type of photometer, in which it is necessary to keep in mind the reading indicated by the pointer after the instrument has been moved from its light-indicating position. It is apparent that the zero or null method, as applied to the pointer 41 in accordance with the present invention is much more accurate than the method in which the reading of the pointer in its extended position is observed according to the prior-art method, for the reason that by the use of the two levers, one having a coarse adjustment and the other a fine adjustment, extreme fineness of measurement can be obtained in a very short length of time; and the measurement obtained is always available for reference.

In Figures 9, 10 and 11 there is shown a modified form of the improved photometer, the main difference being the manner in which the pointer is restored to zero. The instrument is contained within a casing 45, which is provided with a rotatable ring 46. The outer periphery of this ring is preferably knurled, as indicated in Figure 6, and at a suitable position about its periphery there is provided a metal tab 47 which terminates in an adjustment pointer 48 (Figure 6), the tab being secured to the ring 46 by the screw 49. In order to permit the ring 46 to be rotated without dropping off of the casing 45, the ring is provided with a plurality of equi-distantly positioned screws 50 which ride within an annular groove 51 formed in the upper portion of the casing 45. The latter is also provided with a shoulder 52 which serves to reduce the load on the screws 51. The upper end of the ring 46 is closed by a glass plate 53 which rests on a web 54 extending inwardly from the ring 46, this web terminating at the center in a portion 55 of greater thickness, which loosely receives a screw 56 having a knurled nut 57.

Within the lower end of the casing 45 there is a flanged ring member 58 which is secured to the casing by screws 58'. The upper end of the ring 58 supports a permanent magnet 59 of laminated character, as indicated, this magnet taking a circular configuration except for a cylindrical slot or groove, indicated at 60, in which the actuating element of the instrument is adapted to swing. This element may comprise a coil of wire 61 wound on a rigid support and which is journalled at each end on the shafts 62, 63, respectively. There extends from the shaft 62 three rods 64, arranged in the form of a cross, and each of these rods carries a ballasting weight 65. A pointer rod 66, of the irregular configuration shown in Figure 11, is secured to the shaft 62, all of the rods 66, 64 being equidistantly spaced from one another about the shaft 62. The latter is journalled in a jewel bearing contained within a screw 67, provided with a head 68 and a frictionless washer 69 which bears against an arcuate-shaped member 70 shown more clearly in Figure 10. The screw 67 is held in position by means of a strap 71, which is bolted or otherwise secured to a plate 72 which rests on top of the permanent magnet. The entire moving coil assembly is held in an aligned position in the permanent magnet 59 by the bent plate 73, which may be secured to the plate 72 by the same bolts as hold the strap 71 in position.

The pointer 66 is given a mechanical bias by means of a spiral filament or hair spring, indicated at 74, the inner end of which is connected to the shaft 62 and the outer end is connected to the arcuate member 70. The latter is pivoted at the screw 67, as can be clearly seen in Figure 10, and the outer edge is provided with teeth 75 which are adapted to mesh with a small pinion 76, held at the center of the web 55 by the screw 56 and nut 57. By loosening nut 57 the zero position of the pointer may be corrected by rotating the screw 56 relative to the ring 46. The mechanical arrangement is such that by rotating the ring 46 the pinion 76 serves to swing the member 70 about its axis, causing the pointer 66 to move against its movement-restoring spring 74. Under these circumstances the coil 61 will also rotate. This coil surrounds a permanent magnet core 77, which is held in position within the slot 60 of the permanent magnet in any suitable manner, for example, by means of a pair of supporting bars 78 which are secured to the magnet 59 and which hold the ends of the core 77 rigidly in place without interfering with the oscillatory movements of the coil 61.

The frame on which the coil is wound is carried on a lower shaft 63, which rests in a jewel bearing contained in the screw 80. There is also a spiral spring or filament 81, the inner end of which is connected to the shaft 63 and the outer end is connected to a rigid conductor 82 which serves as one of the terminals of the coil 61. The other terminal of the coil is taken through the upper hair spring 74, and thence through the conductor 83. The hair spring 81 serves the same purpose as the spring 74 in applying torsional force on the pointer 66, tending to hold the pointer at its zero or null position. However, hair spring 74 has the additional function of causing a swing of the pointer when the arcuate member 70 is rotated by the pinion 76, which in turn is controlled by the rotational movements of the ring 46. The screw 80, which provides the lower bearing for the moving coil, is held in position by a strap 84 which may be bolted or otherwise secured to the magnet 59, as can be plainly seen in Figure 9. The lower end of the casing 45 is practically entirely open except for the inwardly extending flange provided on the support ring 58, this ring having an opening which is sufficient to provide space for a photovoltaic cell 85, which may be of the same type as described in detail in connection with Figure 1. The two terminals of the cell, indicated at 86, are connected to the wire 83 and to the rigid conductor 82. These terminals may be formed of screws which serve to secure the cell to the ring member 58 by means of the bridges 92.

In case it is desired to use the instrument as a photometer, the active surface of the photovoltaic cell 85 is exposed to the light which is to be measured, and the generated electromotive force is applied across the coil 61. The flux set up by this coil reacts with the flux of the magnet 59 in such a manner as to cause the pointer 66 to swing on its shaft 62 to a position which will give an accurate measurement of the intensity of the light which strikes the photovoltaic cell. The ring 46 is then rotated in such a direction as to actuate the pinion 76 and the arcuate gear 70, and to cause the pointer 66 to move to its original zero position. Actually the rotation of the ring 46 assists the hair springs 74, 81 to overcome the force exerted on the coil 61 by the electrical current passing through the coil.

In rotating the ring 46 to restore the position of the pointer 66 to zero, the permanent recording pointer 48 which is attached to the ring 46, now reaches a position along the casing 45 which may be read off in candle power or lumens. The greater the intensity of the light which strikes the cell 85 the farther will it be necessary to rotate the ring 46 to restore the pointer 66 to zero, and the greater will be the reading indicated at the pointer 48. It is apparent that this reading always remains on the instrument until a new sight on a lighted object is taken. The value of being able to refer at any time desired to the measurement last shown by the instrument is invaluable in connection with photometers (light-measuring devices), but is even more useful in connection with exposure meters, to which my improved device may be readily adapted.

Referring now to Figures 6 and 8, there may be provided on the casing 45, charts which can be readily slipped into place and readily removed and which will tell at a glance the time in seconds required for an exposure for a given "f" number of lens. A number of these charts for as many emulsion speeds as desired may be sold with the exposure meter, and when locked in position by the semi-circular projection indicated at 87, will give a direct reading of the proper time of exposure. There is no longer any necessity for keeping in mind the light measurement which had been obtained before the instrument was withdrawn from its light-receiving position in order to make the exposure calculations, and repeated reference can be made to the position of the pointer 48 until a new sight on an object has been taken.

The time exposure chart 88 may be made of unbreakable material such as aluminum, with the numbers printed thereon as large as possible. Inasmuch as the pointer 48 directly transfers the light measurement to the chart 88, whereas in prior art exposure meters separate columns of figures or complicated mechanism must be provided to effect this transfer, the material set forth on the chart 88 can be in relatively large print and easily discernible. The chart 88 is held at its upper edge against a shoulder 89 and is of such width as to stop short of the bottom of the casing 45. A cap 90, preferably of metal, fits over the bottom of the casing, holding the chart rigidly in position. When it is desired to substitute charts, as for example when the emulsion speed is different from that for which the figures of the original chart 88 were computed, it is only necessary to remove the cap 90 and the chart 88, placing the new chart 91, which has been computed for an emulsion speed of 20, in position, after which the cap 90 is returned to position.

It is apparent that my improved exposure meter operates on the null or balanced method, in which the light causes the pointer 66 to move away from its zero position, and the ring 46 is rotated to return the pointer to its null or balanced position. By operating on this principle instead of on the principle of observing the position assumed by the pointer, and keeping it constantly in mind during the exposure calculations, I obtain at least three outstanding advantages. One of these is that the position of the indicating pointer 48 becomes a constant reference of the light measurement previously taken. There is no numbering of the light readings. The arrangement between the recording pointer 48 and the chart 88 is such as to permit a direct transfer of information from the photometer to the exposure meter portion of the device, thus eliminating at least one of the columns of figures which are ordinarily found on a typical exposure meter.

Finally, the fact that the pointer 66 is restored to zero by a rotative force exercised on the ring 46, permits any degree of slow movement between the movement of the pointer 66 and the movement of the pointer indicator 48. Thus, in Figure 10, the pinion 76 and the arcuate gear 75 have a slow speed ratio, permitting the ring 46 to be moved over a considerable distance for a relatively small change of the pointer 48, thus allowing great accuracy in making the determinations.

It will be understood that I desire to comprehend within my invention such modifications as come within the scope of the claims and the invention.

Having thus fully described my invention, what I claim as new and desire to secure by Letters Patent is:

1. A photographic exposure meter comprising a measuring device including a pointer and a photovoltaic cell connected to said device, said cell causing the pointer to swing into a position which depends upon the intensity of the light impinging on the cell, means for restoring the pointer to its null position, a chart, a pointer moving thereover, and operative connection between said pointers, said chart having thereon indicating means for indicating the amount of restoring force necessary, which is translated into photographic exposure information.

2. A light meter comprising a current-measuring device including a light-sensitive element and a coil carrying a pointer, said coil being adapted to swing within a permanent magnetic field and being connected to said light-sensitive element whereby the coil assumes a position with respect to said field which bears a direct relation to the intensity of light which reaches the light-sensitive element, a time exposure chart, a pointer moving thereover, operative connection between said pointers, manual means for restoring said first-named pointer to its initial position and for simultaneously actuating said second-named pointer for translating the amount of restorative effort necessary into photographic time exposure.

3. An electrical instrument comprising a measuring device including a pointer and a light-sensitive element, means responsive to the light reaching said element for energizing said device and for causing the pointer to swing into a position which depends upon the intensity of the impinging light, two levers for restoring said pointer to zero, one of the levers having connection with said pointer through a light hair spring and the other lever having connection with said pointer through a heavy hair spring to provide for fine or rough adjustments during the pointer restoring operation, and scale means and pointers associated with said levers.

4. An electrical instrument comprising a measuring device including a pointer and a light-sensitive element, means responsive to the light reaching said element for energizing said device and for causing the pointer to swing into a position which depends upon the intensity of the impinging light, two levers for restoring said pointer to zero, one of the levers having connection with said pointer through a light hair spring and the other lever having connection with said pointer through a heavy hair spring to provide for fine or rough adjustments during the pointer restoring operation, said levers having pointers, and scales having respectively fine and course graduations over which said pointers move.

FREDERICK J. LINGEL